United States Patent
Hughes

(10) Patent No.: US 9,130,991 B2
(45) Date of Patent: Sep. 8, 2015

(54) PROCESSING DATA PACKETS IN PERFORMANCE ENHANCING PROXY (PEP) ENVIRONMENT

(75) Inventor: David Anthony Hughes, Los Altos, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 226 days.

(21) Appl. No.: 13/274,162

(22) Filed: Oct. 14, 2011

(65) Prior Publication Data

US 2013/0094501 A1    Apr. 18, 2013

(51) Int. Cl.
| | |
|---|---|
| H04L 9/32 | (2006.01) |
| H04L 29/06 | (2006.01) |
| H04L 29/08 | (2006.01) |

(52) U.S. Cl.
CPC ............... *H04L 69/16* (2013.01); *H04L 69/22* (2013.01); *H04L 69/32* (2013.01); *H04L 69/04* (2013.01)

(58) Field of Classification Search
CPC ....... H04L 69/16; H04L 47/10; H04L 47/193; H04L 69/163; H04L 47/14; H04L 45/00; H04B 7/18582; H04B 7/18584; H04W 80/00
USPC ............ 370/389, 252, 395.32, 743, 469, 401, 370/466; 709/237, 243, 228, 238, 230; 726/1
See application file for complete search history.

(56) References Cited

U.S. PATENT DOCUMENTS

| | | | |
|---|---|---|---|
| 5,243,341 A | 9/1993 | Seroussi et al. | |
| 5,307,413 A | 4/1994 | Denzer | |
| 5,359,720 A | 10/1994 | Tamura et al. | |
| 5,373,290 A | 12/1994 | Lempel et al. | |
| 5,483,556 A | 1/1996 | Pillan et al. | |
| 5,532,693 A | 7/1996 | Winters et al. | |
| 5,592,613 A | 1/1997 | Miyazawa et al. | |
| 5,611,049 A | 3/1997 | Pitts | |
| 5,675,587 A | 10/1997 | Okuyama et al. | |

(Continued)

FOREIGN PATENT DOCUMENTS

EP    1507353 A2    2/2005

OTHER PUBLICATIONS

"IPsec Anti-Replay Window: Expanding and Disabling," Cisco IOS Security Configuration Guide. 2005-2006 Cisco Systems, Inc. Last updated: Sep. 12, 2006, 14pages (Previously cited as: Zhao et al.; "Analysis and Improvement on IPSEC Anti-Replay Window Protocol"; 2003; IEEE' pp. 553-558).

(Continued)

*Primary Examiner* — Robert Wilson
*Assistant Examiner* — Sai Aung
(74) *Attorney, Agent, or Firm* — Carr & Ferrell LLP

(57) ABSTRACT

Methods and systems for processing network packets within a Performance Enhancing Proxy (PEP) environment are described. An example method comprises receiving network data to be transported between a first PEP and a second PEP. The network data is segmented in one or more original network packets. The method may further comprise collecting packet identifying data associated with the one or more original network packets before the network data is packetized into one or more performance enhanced packets by the first PEP. The method may further comprise transmitting the identifying data to the second PEP. Upon receiving of the identifying data, the second PEP may recreate the segmentation of the original network data.

30 Claims, 7 Drawing Sheets

(56) References Cited

U.S. PATENT DOCUMENTS

| | | | | |
|---|---|---|---|---|
| 5,754,774 | A | 5/1998 | Bittinger et al. | |
| 5,802,106 | A | 9/1998 | Packer | |
| 5,805,822 | A * | 9/1998 | Long et al. | 709/232 |
| 5,883,891 | A | 3/1999 | Williams et al. | |
| 5,903,230 | A | 5/1999 | Masenas | |
| 6,000,053 | A | 12/1999 | Levine et al. | |
| 6,003,087 | A | 12/1999 | Housel, III et al. | |
| 6,081,883 | A | 6/2000 | Popelka et al. | |
| 6,175,944 | B1 * | 1/2001 | Urbanke et al. | 714/776 |
| 6,295,541 | B1 | 9/2001 | Bodnar et al. | |
| 6,308,148 | B1 | 10/2001 | Bruins et al. | |
| 6,311,260 | B1 | 10/2001 | Stone et al. | |
| 6,339,616 | B1 | 1/2002 | Kovalev | |
| 6,374,266 | B1 | 4/2002 | Shnelvar | |
| 6,434,662 | B1 | 8/2002 | Greene et al. | |
| 6,438,664 | B1 | 8/2002 | McGrath et al. | |
| 6,452,915 | B1 | 9/2002 | Jorgensen | |
| 6,587,985 | B1 | 7/2003 | Fukushima et al. | |
| 6,618,397 | B1 | 9/2003 | Huang | |
| 6,633,953 | B2 | 10/2003 | Stark | |
| 6,643,259 | B1 | 11/2003 | Borella et al. | |
| 6,650,644 | B1 | 11/2003 | Colley et al. | |
| 6,653,954 | B2 | 11/2003 | Rijavec | |
| 6,667,700 | B1 | 12/2003 | McCanne et al. | |
| 6,674,769 | B1 | 1/2004 | Viswanath | |
| 6,718,361 | B1 | 4/2004 | Basani et al. | |
| 6,738,379 | B1 | 5/2004 | Balazinski et al. | |
| 6,769,048 | B2 | 7/2004 | Goldberg et al. | |
| 6,791,945 | B1 | 9/2004 | Levenson et al. | |
| 6,856,651 | B2 | 2/2005 | Singh | |
| 6,859,842 | B1 | 2/2005 | Nakamichi et al. | |
| 6,910,106 | B2 | 6/2005 | Sechrest et al. | |
| 6,968,374 | B2 | 11/2005 | Lemieux et al. | |
| 6,978,384 | B1 | 12/2005 | Milliken | |
| 7,007,044 | B1 | 2/2006 | Rafert et al. | |
| 7,020,750 | B2 | 3/2006 | Thiyagaranjan et al. | |
| 7,035,214 | B1 | 4/2006 | Seddigh et al. | |
| 7,047,281 | B1 | 5/2006 | Kausik | |
| 7,069,342 | B1 | 6/2006 | Biederman | |
| 7,113,962 | B1 | 9/2006 | Kee et al. | |
| 7,120,666 | B2 | 10/2006 | McCanne et al. | |
| 7,145,889 | B1 | 12/2006 | Zhang et al. | |
| 7,197,597 | B1 | 3/2007 | Scheid et al. | |
| 7,200,847 | B2 | 4/2007 | Straube et al. | |
| 7,215,667 | B1 | 5/2007 | Davis | |
| 7,242,681 | B1 | 7/2007 | Van Bokkelen et al. | |
| 7,243,094 | B2 | 7/2007 | Tabellion et al. | |
| 7,266,645 | B2 | 9/2007 | Garg et al. | |
| 7,318,100 | B2 | 1/2008 | Demmer et al. | |
| 7,366,829 | B1 | 4/2008 | Luttrell et al. | |
| 7,380,006 | B2 | 5/2008 | Srinivas et al. | |
| 7,383,329 | B2 | 6/2008 | Erickson | |
| 7,383,348 | B2 | 6/2008 | Seki et al. | |
| 7,388,844 | B1 | 6/2008 | Brown et al. | |
| 7,389,357 | B2 | 6/2008 | Duffie, III et al. | |
| 7,389,393 | B1 | 6/2008 | Karr et al. | |
| 7,417,570 | B2 | 8/2008 | Srinivasan et al. | |
| 7,417,991 | B1 | 8/2008 | Crawford et al. | |
| 7,420,992 | B1 | 9/2008 | Fang et al. | |
| 7,428,573 | B2 | 9/2008 | McCanne et al. | |
| 7,451,237 | B2 | 11/2008 | Takekawa et al. | |
| 7,453,379 | B2 | 11/2008 | Plamondon | |
| 7,454,443 | B2 | 11/2008 | Ram et al. | |
| 7,457,315 | B1 | 11/2008 | Smith | |
| 7,460,473 | B1 * | 12/2008 | Kodama et al. | 370/230 |
| 7,471,629 | B2 | 12/2008 | Melpignano | |
| 7,532,134 | B2 | 5/2009 | Samuels et al. | |
| 7,555,484 | B2 | 6/2009 | Kulkarni et al. | |
| 7,571,343 | B1 | 8/2009 | Xiang et al. | |
| 7,571,344 | B2 | 8/2009 | Hughes et al. | |
| 7,587,401 | B2 | 9/2009 | Yeo et al. | |
| 7,596,802 | B2 * | 9/2009 | Border et al. | 726/1 |
| 7,619,545 | B2 | 11/2009 | Samuels et al. | |
| 7,620,870 | B2 | 11/2009 | Srinivasan et al. | |
| 7,624,446 | B1 | 11/2009 | Wilhelm | |
| 7,630,295 | B2 | 12/2009 | Hughes et al. | |
| 7,639,700 | B1 | 12/2009 | Nabhan et al. | |
| 7,643,426 | B1 | 1/2010 | Lee et al. | |
| 7,644,230 | B1 | 1/2010 | Hughes et al. | |
| 7,676,554 | B1 | 3/2010 | Malmskog et al. | |
| 7,698,431 | B1 | 4/2010 | Hughes | |
| 7,702,843 | B1 | 4/2010 | Chen et al. | |
| 7,714,747 | B2 | 5/2010 | Fallon | |
| 7,746,781 | B1 | 6/2010 | Xiang | |
| 7,764,606 | B1 | 7/2010 | Ferguson et al. | |
| 7,827,237 | B2 | 11/2010 | Plamondon | |
| 7,849,134 | B2 | 12/2010 | McCanne et al. | |
| 7,853,699 | B2 | 12/2010 | Wu et al. | |
| 7,873,786 | B1 | 1/2011 | Singh et al. | |
| 7,941,606 | B1 | 5/2011 | Pullela et al. | |
| 7,945,736 | B2 | 5/2011 | Hughes et al. | |
| 7,948,921 | B1 | 5/2011 | Hughes et al. | |
| 7,953,869 | B2 | 5/2011 | Demmer et al. | |
| 7,970,898 | B2 * | 6/2011 | Clubb et al. | 709/224 |
| 8,069,225 | B2 | 11/2011 | McCanne et al. | |
| 8,095,774 | B1 | 1/2012 | Hughes et al. | |
| 8,140,757 | B1 | 3/2012 | Singh et al. | |
| 8,171,238 | B1 | 5/2012 | Hughes et al. | |
| 8,209,334 | B1 * | 6/2012 | Doerner | 707/747 |
| 8,225,072 | B2 | 7/2012 | Hughes et al. | |
| 8,307,115 | B1 | 11/2012 | Hughes | |
| 8,312,226 | B2 | 11/2012 | Hughes | |
| 8,352,608 | B1 | 1/2013 | Keagy et al. | |
| 8,370,583 | B2 | 2/2013 | Hughes | |
| 8,392,684 | B2 | 3/2013 | Hughes | |
| 8,442,052 | B1 | 5/2013 | Hughes | |
| 8,473,714 | B2 | 6/2013 | Hughes et al. | |
| 8,489,562 | B1 | 7/2013 | Hughes et al. | |
| 8,565,118 | B2 | 10/2013 | Shukla et al. | |
| 8,595,314 | B1 | 11/2013 | Hughes | |
| 8,706,947 | B1 | 4/2014 | Vincent | |
| 8,725,988 | B2 | 5/2014 | Hughes et al. | |
| 8,732,423 | B1 | 5/2014 | Hughes | |
| 8,738,865 | B1 | 5/2014 | Hughes et al. | |
| 8,743,683 | B1 | 6/2014 | Hughes | |
| 8,755,381 | B2 | 6/2014 | Hughes et al. | |
| 8,811,431 | B2 | 8/2014 | Hughes | |
| 8,929,380 | B1 | 1/2015 | Hughes et al. | |
| 8,929,402 | B1 | 1/2015 | Hughes | |
| 8,930,650 | B1 | 1/2015 | Hughes et al. | |
| 2001/0054084 | A1 | 12/2001 | Kosmynin | |
| 2002/0007413 | A1 | 1/2002 | Garcia-Luna-Aceves et al. | |
| 2002/0040475 | A1 | 4/2002 | Yap et al. | |
| 2002/0061027 | A1 | 5/2002 | Abiru et al. | |
| 2002/0065998 | A1 | 5/2002 | Buckland | |
| 2002/0071436 | A1 * | 6/2002 | Border et al. | 370/395.32 |
| 2002/0078242 | A1 | 6/2002 | Viswanath | |
| 2002/0101822 | A1 | 8/2002 | Ayyagari et al. | |
| 2002/0107988 | A1 | 8/2002 | Jordan | |
| 2002/0116424 | A1 | 8/2002 | Radermacher et al. | |
| 2002/0131434 | A1 | 9/2002 | Vukovic et al. | |
| 2002/0150041 | A1 | 10/2002 | Reinshmidt et al. | |
| 2002/0163911 | A1 | 11/2002 | Wee et al. | |
| 2002/0169818 | A1 | 11/2002 | Stewart et al. | |
| 2002/0181494 | A1 | 12/2002 | Rhee | |
| 2002/0188871 | A1 | 12/2002 | Noehring et al. | |
| 2002/0194324 | A1 | 12/2002 | Guha | |
| 2003/0002664 | A1 | 1/2003 | Anand | |
| 2003/0009558 | A1 | 1/2003 | Ben-Yehezkel | |
| 2003/0123481 | A1 * | 7/2003 | Neale et al. | 370/466 |
| 2003/0131079 | A1 * | 7/2003 | Neale et al. | 709/220 |
| 2003/0133568 | A1 | 7/2003 | Stein et al. | |
| 2003/0142658 | A1 | 7/2003 | Ofuji et al. | |
| 2003/0149661 | A1 | 8/2003 | Mitchell et al. | |
| 2003/0149869 | A1 | 8/2003 | Gleichauf | |
| 2003/0233431 | A1 | 12/2003 | Reddy et al. | |
| 2004/0008711 | A1 | 1/2004 | Lahti et al. | |
| 2004/0047308 | A1 | 3/2004 | Kavanagh et al. | |
| 2004/0083299 | A1 | 4/2004 | Dietz et al. | |
| 2004/0086114 | A1 | 5/2004 | Rarick | |
| 2004/0088376 | A1 | 5/2004 | McCanne et al. | |
| 2004/0114569 | A1 | 6/2004 | Naden et al. | |
| 2004/0117571 | A1 | 6/2004 | Chang et al. | |
| 2004/0123139 | A1 | 6/2004 | Aiello et al. | |

(56) References Cited

U.S. PATENT DOCUMENTS

| | | | |
|---|---|---|---|
| 2004/0179542 A1 | 9/2004 | Murakami et al. | |
| 2004/0199771 A1 | 10/2004 | Morten et al. | |
| 2004/0202110 A1 | 10/2004 | Kim | |
| 2004/0203820 A1 | 10/2004 | Billhartz | |
| 2004/0205332 A1 | 10/2004 | Bouchard et al. | |
| 2004/0243571 A1 | 12/2004 | Judd | |
| 2004/0255048 A1 | 12/2004 | Lev Ran et al. | |
| 2005/0010653 A1 | 1/2005 | McCanne | |
| 2005/0044270 A1 | 2/2005 | Grove et al. | |
| 2005/0053094 A1 | 3/2005 | Cain et al. | |
| 2005/0091234 A1 | 4/2005 | Hsu et al. | |
| 2005/0111460 A1 | 5/2005 | Sahita | |
| 2005/0131939 A1 | 6/2005 | Douglis et al. | |
| 2005/0132252 A1 | 6/2005 | Fifer et al. | |
| 2005/0141425 A1 | 6/2005 | Foulds | |
| 2005/0171937 A1 | 8/2005 | Hughes et al. | |
| 2005/0177603 A1 | 8/2005 | Shavit | |
| 2005/0190694 A1 | 9/2005 | Ben-Nun et al. | |
| 2005/0207443 A1* | 9/2005 | Kawamura et al. | 370/469 |
| 2005/0210151 A1 | 9/2005 | Abdo et al. | |
| 2005/0220019 A1 | 10/2005 | Melpignano | |
| 2005/0235119 A1 | 10/2005 | Sechrest et al. | |
| 2005/0243743 A1 | 11/2005 | Kimura | |
| 2005/0243835 A1 | 11/2005 | Sharma et al. | |
| 2005/0256972 A1 | 11/2005 | Cochran et al. | |
| 2005/0278459 A1 | 12/2005 | Boucher et al. | |
| 2005/0286526 A1 | 12/2005 | Sood et al. | |
| 2006/0013210 A1 | 1/2006 | Bordogna et al. | |
| 2006/0026425 A1 | 2/2006 | Douceur et al. | |
| 2006/0031936 A1 | 2/2006 | Nelson et al. | |
| 2006/0036901 A1 | 2/2006 | Yang et al. | |
| 2006/0039354 A1 | 2/2006 | Rao et al. | |
| 2006/0059171 A1 | 3/2006 | Borthakur et al. | |
| 2006/0059173 A1 | 3/2006 | Hirsch et al. | |
| 2006/0117385 A1 | 6/2006 | Mester et al. | |
| 2006/0143497 A1 | 6/2006 | Zohar et al. | |
| 2006/0195547 A1 | 8/2006 | Sundarrajan et al. | |
| 2006/0195840 A1 | 8/2006 | Sundarrajan et al. | |
| 2006/0212426 A1 | 9/2006 | Shakara et al. | |
| 2006/0218390 A1 | 9/2006 | Loughran et al. | |
| 2006/0227717 A1 | 10/2006 | van den Berg et al. | |
| 2006/0250965 A1 | 11/2006 | Irwin | |
| 2006/0268932 A1 | 11/2006 | Singh et al. | |
| 2006/0280205 A1 | 12/2006 | Cho | |
| 2007/0002804 A1 | 1/2007 | Xiong et al. | |
| 2007/0011424 A1 | 1/2007 | Sharma et al. | |
| 2007/0038815 A1 | 2/2007 | Hughes | |
| 2007/0038816 A1 | 2/2007 | Hughes et al. | |
| 2007/0038858 A1 | 2/2007 | Hughes | |
| 2007/0050475 A1 | 3/2007 | Hughes | |
| 2007/0076693 A1 | 4/2007 | Krishnaswamy | |
| 2007/0097874 A1 | 5/2007 | Hughes et al. | |
| 2007/0110046 A1 | 5/2007 | Farrell et al. | |
| 2007/0115812 A1 | 5/2007 | Hughes | |
| 2007/0127372 A1 | 6/2007 | Khan et al. | |
| 2007/0130114 A1 | 6/2007 | Li et al. | |
| 2007/0140129 A1 | 6/2007 | Bauer et al. | |
| 2007/0174428 A1 | 7/2007 | Lev Ran et al. | |
| 2007/0195702 A1 | 8/2007 | Yuen et al. | |
| 2007/0198523 A1 | 8/2007 | Hayim | |
| 2007/0226320 A1 | 9/2007 | Hager et al. | |
| 2007/0244987 A1 | 10/2007 | Pedersen et al. | |
| 2007/0245079 A1 | 10/2007 | Bhattacharjee et al. | |
| 2007/0248084 A1 | 10/2007 | Whitehead | |
| 2007/0258468 A1 | 11/2007 | Bennett | |
| 2007/0263554 A1 | 11/2007 | Finn | |
| 2007/0276983 A1 | 11/2007 | Zohar et al. | |
| 2007/0280245 A1 | 12/2007 | Rosberg | |
| 2008/0005156 A1 | 1/2008 | Edwards et al. | |
| 2008/0013532 A1 | 1/2008 | Garner et al. | |
| 2008/0016301 A1 | 1/2008 | Chen | |
| 2008/0028467 A1 | 1/2008 | Kommareddy et al. | |
| 2008/0031149 A1 | 2/2008 | Hughes et al. | |
| 2008/0031240 A1 | 2/2008 | Hughes et al. | |
| 2008/0095060 A1 | 4/2008 | Yao | |
| 2008/0133536 A1 | 6/2008 | Bjomer et al. | |
| 2008/0184081 A1 | 7/2008 | Hama et al. | |
| 2008/0205445 A1* | 8/2008 | Kumar et al. | 370/469 |
| 2008/0229137 A1 | 9/2008 | Samuels et al. | |
| 2008/0243992 A1 | 10/2008 | Jardetzky et al. | |
| 2008/0267217 A1* | 10/2008 | Colville et al. | 370/477 |
| 2008/0313318 A1 | 12/2008 | Vermeulen et al. | |
| 2008/0320151 A1 | 12/2008 | McCanne et al. | |
| 2009/0024763 A1* | 1/2009 | Stepin et al. | 709/247 |
| 2009/0060198 A1 | 3/2009 | Little | |
| 2009/0063696 A1* | 3/2009 | Wang et al. | 709/232 |
| 2009/0080460 A1* | 3/2009 | Kronewitter et al. | 370/466 |
| 2009/0092137 A1 | 4/2009 | Haigh et al. | |
| 2009/0100483 A1 | 4/2009 | McDowell | |
| 2009/0158417 A1 | 6/2009 | Khanna et al. | |
| 2009/0175172 A1 | 7/2009 | Prytz et al. | |
| 2009/0234966 A1 | 9/2009 | Samuels et al. | |
| 2009/0265707 A1 | 10/2009 | Goodman et al. | |
| 2009/0279550 A1 | 11/2009 | Romrell et al. | |
| 2009/0281984 A1 | 11/2009 | Black | |
| 2010/0005222 A1 | 1/2010 | Brant et al. | |
| 2010/0011125 A1 | 1/2010 | Yang et al. | |
| 2010/0020693 A1 | 1/2010 | Thakur | |
| 2010/0054142 A1* | 3/2010 | Moiso et al. | 370/252 |
| 2010/0070605 A1 | 3/2010 | Hughes et al. | |
| 2010/0077251 A1 | 3/2010 | Liu et al. | |
| 2010/0085964 A1* | 4/2010 | Weir et al. | 370/389 |
| 2010/0115137 A1 | 5/2010 | Kim et al. | |
| 2010/0121957 A1* | 5/2010 | Roy et al. | 709/227 |
| 2010/0124239 A1 | 5/2010 | Hughes | |
| 2010/0131957 A1 | 5/2010 | Kami | |
| 2010/0225658 A1 | 9/2010 | Coleman | |
| 2010/0290364 A1 | 11/2010 | Black | |
| 2010/0318892 A1 | 12/2010 | Teevan et al. | |
| 2011/0002346 A1 | 1/2011 | Wu | |
| 2011/0022812 A1 | 1/2011 | van der Linden et al. | |
| 2011/0154329 A1 | 6/2011 | Arcese et al. | |
| 2011/0219181 A1 | 9/2011 | Hughes et al. | |
| 2011/0276963 A1 | 11/2011 | Wu et al. | |
| 2012/0036325 A1 | 2/2012 | Mashtizadeh et al. | |
| 2012/0173759 A1 | 7/2012 | Agarwal et al. | |
| 2012/0221611 A1 | 8/2012 | Watanabe et al. | |
| 2012/0239872 A1 | 9/2012 | Hughes et al. | |
| 2013/0044751 A1 | 2/2013 | Casado et al. | |
| 2013/0080619 A1 | 3/2013 | Assuncao et al. | |
| 2013/0086236 A1 | 4/2013 | Baucke et al. | |
| 2013/0117494 A1 | 5/2013 | Hughes et al. | |
| 2013/0121209 A1 | 5/2013 | Padmanabhan et al. | |
| 2013/0263125 A1 | 10/2013 | Shamsee et al. | |
| 2013/0282970 A1 | 10/2013 | Hughes et al. | |
| 2014/0052864 A1 | 2/2014 | Van Der Linden et al. | |
| 2014/0123213 A1 | 5/2014 | Vank et al. | |
| 2014/0181381 A1 | 6/2014 | Hughes et al. | |
| 2014/0379937 A1 | 12/2014 | Hughes et al. | |

OTHER PUBLICATIONS

Singh et al. ; "Future of Internet Security—IPSEC"; 2005; pp. 1-8.

Muthitacharoen, Athicha et al., "A Low-bandwidth Network File System," 2001, in Proc. of the 18th ACM Symposium on Operating Systems Principles, Banff, Canada, pp. 174-187.

"Shared LAN Cache Datasheet", 1996, http://www.lancache.com/slcdata.htm.

Spring et al., "A protocol-independent technique for eliminating redundant network traffic", ACM SIGCOMM Computer Communication Review, vol. 30, Issue 4 (Oct. 2000) pp. 87-95, Year of Publication: 2000.

Hong, B et al. "Duplicate data elimination in a SAN file system", In Proceedings of the 21st Symposium on Mass Storage Systems (MSS '04), Goddard, MD, Apr. 2004. IEEE.

You, L. L. and Karamanolis, C. 2004. "Evaluation of efficient archival storage techniques", In Proceedings of the 21st IEEE Symposium on Mass Storage Systems and Technologies (MSST).

Douglis, F. et al., "Application specific Delta-encoding via Resemblance Detection", Published in the 2003 USENIX Annual Technical Conference.

You, L. L. et al., "Deep Store an Archival Storage System Architecture" Data Engineering, 2005. ICDE 2005. Proceedings of the 21st. Intl. Conf. on Data Eng., Tokyo, Japan, Apr. 5-8, 2005, pp. 12.

(56) References Cited

OTHER PUBLICATIONS

Manber, Udi, "Finding Similar Files in a Large File System", TR 93-33 Oct. 1994, Department of Computer Science, University of Arizona. http://webglimpse.net/pubs/TR93-33.pdf. Also appears in the 1994 winter USENIX Technical Conference.

Knutsson, Bjorn et al., "Transparent Proxy Signalling", Journal of Communications and Networks, vol. 3, No. 2, Jun. 2001.

Silver Peak Systems, "The Benefits of Byte-level WAN Deduplication" (2008).

Definition memory (n), Webster's Third New International Dictionary, Unabridged (1993), available at <http://lionreference.chadwyck.com> (Dictionaries/Webster's Dictionary).

Definition appliance, 2c, Webster's Third New International Dictionary, Unabridged (1993), available at <http://lionreference.chadwyck.com> (Dictionaries/Webster's Dictionary).

Newton, "Newton's Telecom Dictionary", 17th Ed., 2001, pp. 38, 201, and 714.

Final Written Decision, Dec. 30, 2014, Inter Partes Review Case No. IPR2013-00403.

Final Written Decision, Dec. 30, 2014, Inter Partes Review Case No. IPR2013-00402.

* cited by examiner

PROCESSING DATA PACKETS IN PERFORMANCE ENHANCING PROXY (PEP) ENVIRONMENT

TECHNICAL FIELD

This disclosure relates generally to networking and, more specifically, to methods and systems for processing data packets in Performance Enhancing Proxy (PEP) environment.

DESCRIPTION OF RELATED ART

The approaches described in this section could be pursued but are not necessarily approaches that have been previously conceived or pursued. Therefore, unless otherwise indicated, it should not be assumed that any of the approaches described in this section qualify as prior art merely by virtue of their inclusion in this section.

Data transfers over Wide Area Networks (WANs), such as the Internet, are widely used to allow the sharing of resources and information between multiple computer systems and hardware components. A WAN may include network optimizing agents such as PEPs. PEPs are designed to improve end-to-end performance of communication protocols such as the Transmission Control Protocol (TCP) and others. PEPs function by breaking the end-to-end connection into multiple connections and using various parameters to transfer data across different legs.

Communication networks may use PEPs to improve TCP performance. End systems (e.g., clients and servers) may use the standard TCP with no modifications, and typically be oblivious to the existence of the PEPs in between. The transport layer of the PEPs may intercept TCP connections between the end systems. The PEPs may then either use TCP or some other protocols to transfer data between them before delivering the data to its final destination.

In one example, TCP data packets transported from a first Local Area Network (LAN) or Wide Area Network (WAN) to a first PEP may be of small, varying, and/or non-optimal lengths. To improve the networking performance, the first PEP may process the incoming data packets, incorporate them into larger data packets, and transmit the larger data packets over the network towards a second PEP. The transmission between the first and second PEPs may be implemented in an improved manner and may, sometimes, use different data transfer standards. Once these enhanced data packets are received by the second PEP, the data packets may be processed and separated into a plurality of data packets. However, instead of recreating the original data packets, new data packets are generated in order to be suitable for the settings of the second LAN, and normally the lengths and data distribution among of the new data packets are different from those received by the first LAN. Thus, the original segmentation data is typically lost when data packets are processed by PEPs.

Unfortunately, some stacks or some applications, especially older ones, may easily break down when they receive these new data packets. This may happen because the lengths of these new data packets differ from the original packets and, therefore, unexpected by the applications. A well written application that follows the rules related to implementing a TCP application may not encounter this problem. However, some applications may not be well written and include latent bugs, which only become apparent when the segmentation of the delivered data packets is different from the original. When such applications receive data packets having unexpected data lengths, they may freeze up or even break down the entire stack, an application, or a computing system. Additionally, if transformations take place while the data is in transit, it is difficult to establish whether the original application/system or the performance enhancing intermediaries are responsible for the application problems (e.g., data corruption).

There are currently no effective methods to prevent such problems and to determine the responsible party within PEP environments.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In accordance with various embodiments and the corresponding disclosure thereof, a computer-implemented method for processing network packets within a PEP environment is provided. The method may comprise receiving network data to be transported between a first PEP and a second PEP. The network data can be segmented into one or more original network packets. The method may further comprise collecting packet identifying data associated with the one or more original network packets before the network data is packetized into one or more performance enhanced packets by the first PEP. The method may further comprise transmitting the identifying data to the second PEP. Based on the identifying data, the second PEP can recreate the segmentation of the network data. The one or more original data packets can be compliant with the TCP. In some example embodiments, the packet identifying data can be transmitted with the network data. The packet identifying data can be inserted into the network data after the network data is compressed and before the network data is encrypted. In other example embodiments, the packet identifying data can be transmitted separately from the network data. The identifying data can be descriptive of the lengths of the one or more original data packets, length deltas, protocol settings, Differentiated Services Code Point (DSCP) markings and the like.

In accordance with other embodiments, a computer-implemented method for processing network packets in a PEP environment is provided. The method may comprise receiving compressed network data to be transported between a first PEP and a second PEP. The network data can be received in one or more original network packets. The method may further comprise collecting packet identifying data associated with the one or more original network packets before the compressed network data is packetized into one or more performance enhanced packets by the first PEP. The method may further comprise transmitting the identifying data to the second PEP. The second PEP may recreate the segmentation of the network data based on the identifying data. The packet identifying data can be transmitted with the network data.

In accordance with yet more embodiments, a system for processing network packets is described. The system may comprise a Local Area Network (LAN) receiving module configured to receive network data to be transported between a first PEP and a second PEP, a Wide Area Network (WAN) receiving module configured to collect packet identifying data associated with the one or more original network packets before the network data is packetized into one or more performance enhanced packets by the first PEP, and a Wide Area Network (WAN) transmitting module configured to transmit the identifying data the second PEP. The system may further comprise a Local Area Network (LAN) transmitting module configured to recreate the segmentation of the network data.

Also disclosed are computer-readable media having instructions stored thereon, which when executed by one or more computers, can cause the one or more computers to implement the methods for processing network packets which are disclosed herein.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
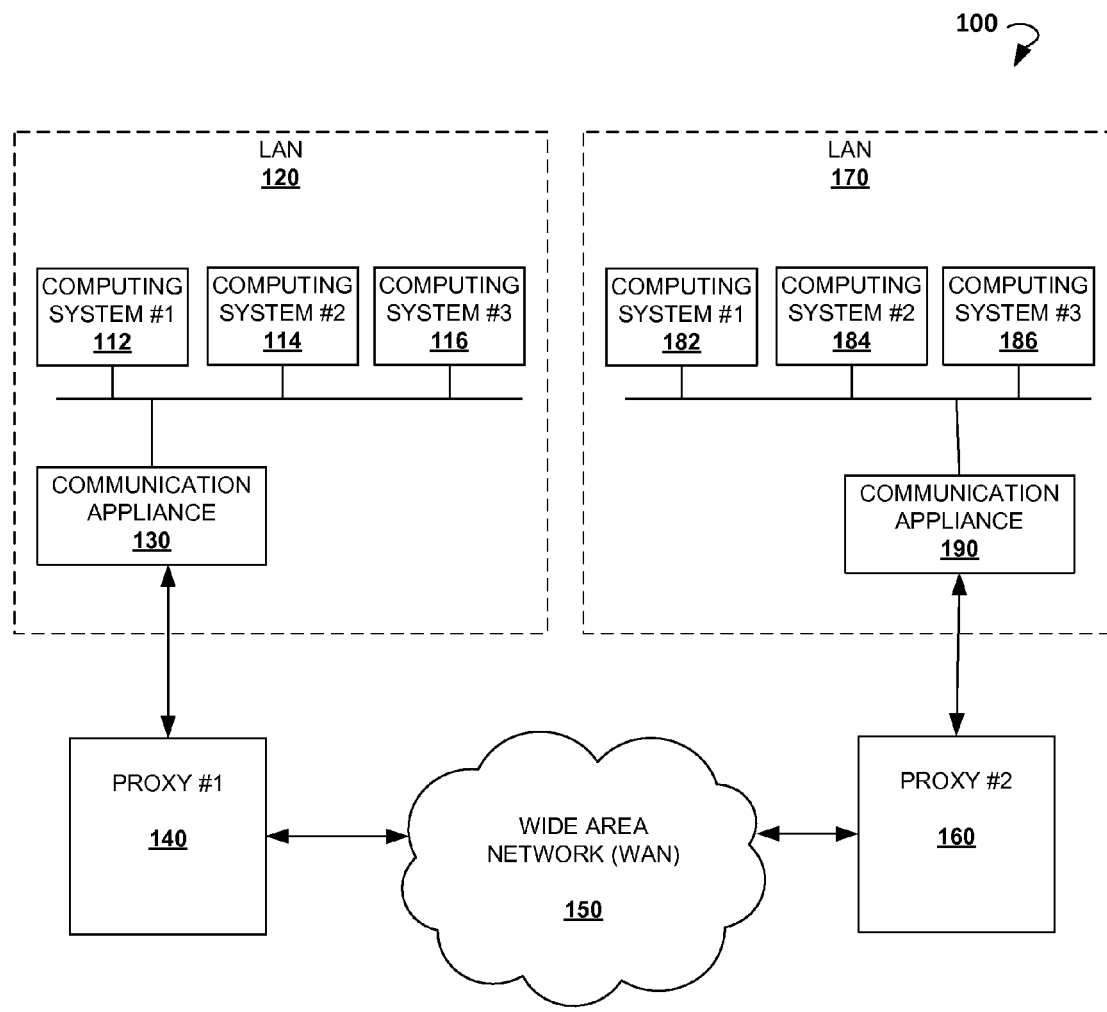
FIG. 1 shows a block diagram illustrating an example network environment suitable for implementing various embodiments.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

Methods and systems for processing network packets within a PEP environment are disclosed. The disclosed approaches are effective ways of processing data packets. The data packets are restored to their original form after they are processed by the PEP proxies, regardless of how they are transmitted through the PEP environment.

The PEP environment may utilize protocols suitable for data transmission over a satellite link, which normally utilizes packets with bigger window sizes. This new data packet may be called a performance enhanced data packet. Each original packet may include a header and a payload. The TCP stack may copy the payload into a buffer that leads to a TCP/IP socket where the payload can be read by an application. In the prior art, as the payloads are copied into the buffer of the TCP stack, the headers are discarded, the data from the original packets is coalesced and any information related to the boundaries of the original packets is lost. Thus, for example, the data previously contained in three packets of 100 bytes can be reassembled into two packets of 150 bytes each. Even though both packets are valid from the TCP point of view, an application may request to read 100 bytes, expecting these 100 bytes to represent the original packet with specific data. However, in the situation this situation, the first 100 bytes of the first 150 byte packet will be read and there would be 50 bytes left unread. When the application reads another 100 bytes of what it expects to be the second 100 byte packet, it will only read 50 bytes left over in the first 150 byte packet. A poorly written application may not check the actual number of bytes read resulting, in this particular example, in an offset of 50 bytes of what is expected.

In the disclosed methods and systems for processing network packets within a PEP environment when the original data packets are first buffered, the first PEP also extracts or otherwise determines length information for every original data packet. In addition, some other information such as, for example, protocol settings, Differentiated Services Code Point (DSCP) markings and the like can be extracted. This data may be collected by the first PEP as "packet identifying data," which is descriptive of original data packet lengths.

The performance enhanced data packet may then be transmitted within the PEP environment. In some examples, the information stored within the performance enhanced data packet can also be compressed and/or encrypted. Either way, the performance enhanced data packet and the packet identifying data are both conveyed to the second PEP. The packet identifying data can be conveyed with other packets, separately from other packets, or even over different data networks. When conveyed with the other packets, the packet identifying data can optionally be incorporated into the performance enhanced data packet (e.g., in the header or between the header and the data segment).

When the performance enhanced data packet is received by the second PEP, new data packets are generated based on the information stored within the performance enhanced data packet. Using the packet identifying data, the original data packets can be recreated. Thus, the recreated data packets can have the same segmentation and same lengths as the original data packets. Thus, when the new data packets are delivered to the destination party, it is like they have never been through the PEP environment.

The following description provides the detailed description of various example embodiments related to methods and systems for processing network packets.

Referring now to the drawings, FIG. 1 shows a block diagram illustrating an exemplary network environment 100 suitable for implementing various embodiments. The network environment 100 may comprise one or more computing systems 112, 114, 116, 182, 184, and 186, which can be integrated within their respective LAN 120 and LAN 170 with the help of one or more respective communication appliances 130 and 190 (e.g., a router and a switch). The computing systems 112, 114, 116, 182, 184, and 186 may be also considered "client" devices. The network environment 100 may further comprise one or more servers, which can also be integrated in a separated LAN (not shown). The computing systems of LAN 120 and LAN 170 may transmit data to each other over a communication network, namely a WAN 150.

The WAN 150 may refer to the Internet, a satellite communication network, or the like. The computing systems LAN 120 and LAN 170 may be communicatively coupled to the WAN 150 through proxies 140 and 160.

The proxies 140 and 160 may refer to servers which can be implemented as hardware, software, or a combination thereof and act as intermediaries for requests between the computing systems 112, 114, 116, 182, 184, and 186. As data travels between LAN 120 and LAN 170, data packets generated by the computing systems 112, 114, 116, 182, 184, and 186 can be broken apart by proxies 140 and 160 and new data packets created. Those skilled in the art would appreciate that the network environment 100 may comprise additional, fewer, or different components depending on the application.

Figure 2:
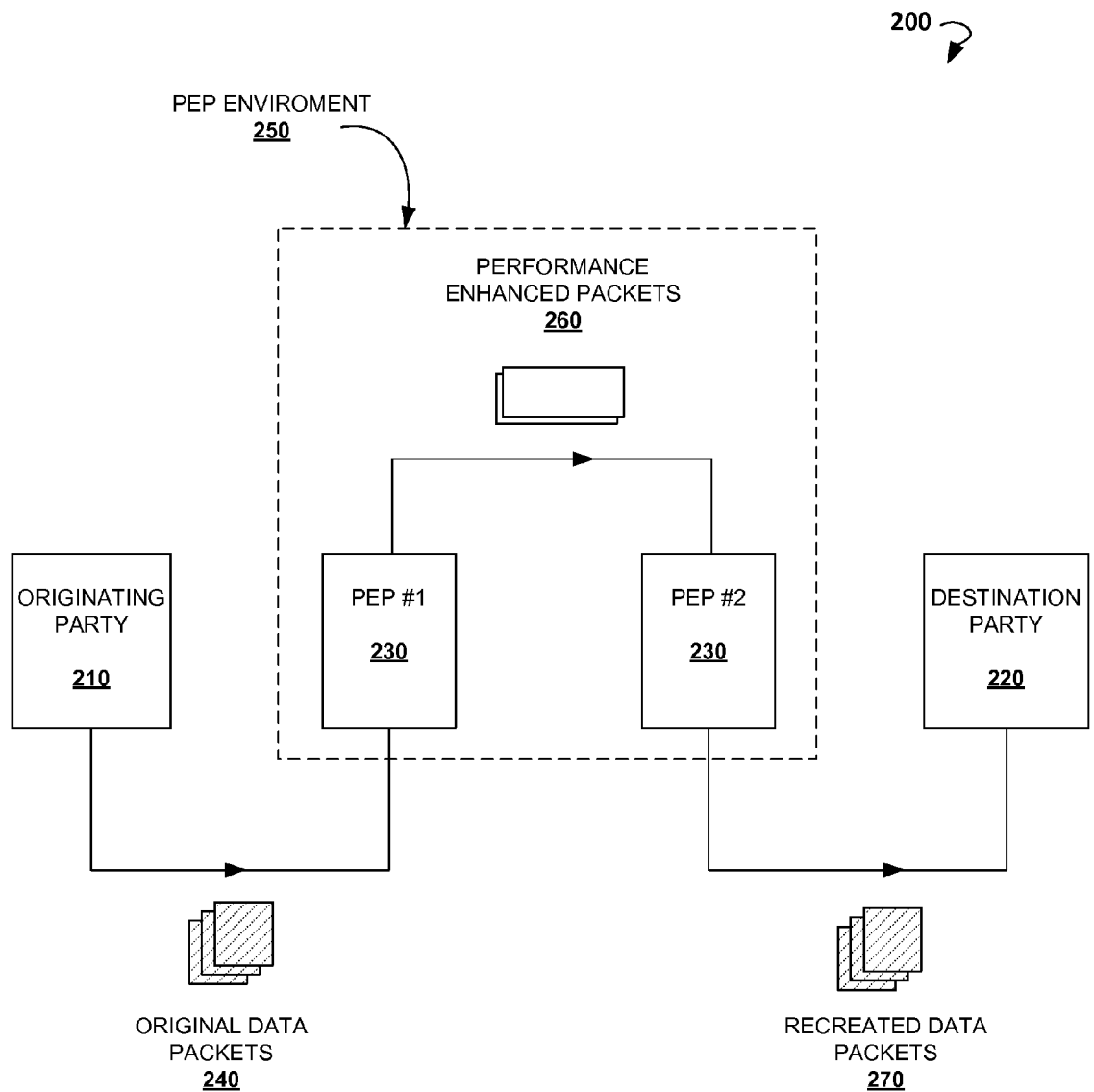
FIG. 2 shows a block diagram illustrating an example network system integrating a PEP environment on which various embodiments can be implemented.

FIG. 2 shows a block diagram illustrating an exemplary network system 200 integrating a PEP environment on which various embodiments can be implemented. In the diagram shown, there is an originating party 210 and a destination party 220 interconnected via a WAN 150. The originating party 210 and the destination party 220 may refer to a computer, a laptop, a tablet computer, a portable computing device, a personal digital assistant (PDA), a handheld cellular phone, a mobile phone, a smart phone, a handheld device having wire or wireless connection capability, or any other electronic device suitable for communicating data via the WAN 150. The originating party 210 and/or the destination party 220 may also refer to a group of interconnected electronic devices, such as a LAN. In some other examples, the originating party 210 and/or the destination party 220 may be simplified to hardware, software, or a combination thereof suitable to generate and process network data packets.

The network system 200 may comprise two or more PEPs 230. The term "PEP," as used herein, refers to a network optimizing agent configured to improve the end-to-end performance of some communications protocols. PEPs can often be used to improve the performance of the IP in environments where native performance suffers for some reason, usually due to a characteristic of the environment. A PEP implementation may function at the TCP layer or at the application layer.

Accordingly, the originating party 210 may generate one or more data packets complying with a certain protocol (e.g., the TCP) and transmit them towards the destination party 220, which may also utilize data packets complying with the same protocol as in the originating party 210. First, original data packets 240 are transmitted to the first PEP 230, where they can be buffered, processed, and reassembled in new data packets, which can comply with another communication protocol suitable for data transmission within the PEP environment 250. Such new data packets are called "performance enhanced packets" 260. Consequently, the performance enhanced packets 260 comprise data obtained from the original data packets 240. In some embodiments, the performance enhanced packets 260 may comprise encrypted and/or compressed data associated with the original data packets 240.

Further, the performance enhanced packets 260 are transmitted to the second PEP 230, where they can be buffered, processed, and reassembled into recreated data packets 270. The recreated data packets 270 are segmented as the original data packets 240. In contrast, in the prior art, the same data can be delivered but the packets may not be of the same lengths.

Figure 3:
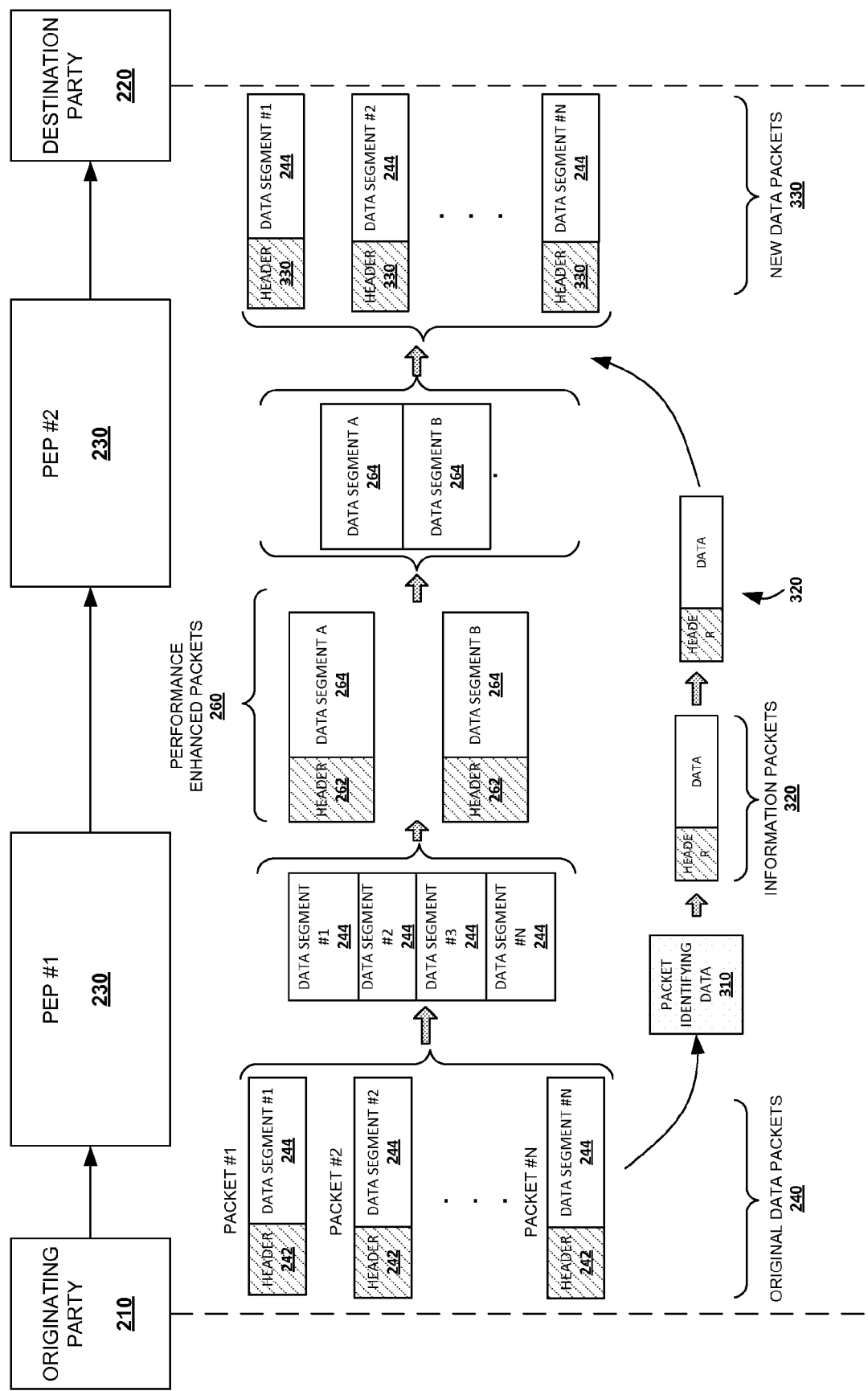
FIG. 3 is a block diagram showing an approach for processing data packets in a PEP environment.

FIG. 3 is a block diagram showing an approach for processing data packets in a PEP environment. As shown in the figure, the originating party 210 may generate 1 to N original data packets 240. Each original data packet 240 may comprise a header 242 to transmit service information (e.g., originating and destination party addresses, check sums, pointers, flags, lengths, sizes, etc.) and a data segment 244. It should be noted that each original data packet 240 may be of the same or different lengths.

The first PEP 230 may receive the original data packets 240 as generated by the originating party 210, discard the headers 242 and coalesce the data segments 244. The first PEP 230 may determine the lengths of each original data packet 240. In some cases, the first PEP 230 does not determine the entire length of the data packet 240, but only the length of the data segment 244. Some examples of length determinations may include reading and analyzing headers (e.g., retrieving and analyzing a maximum segment size (MSS) parameter, a maximum transmission unit (MTU) parameters, etc.), counting data packet length, calculating differences (deltas) between different data packets, and so forth. The information related to the lengths of every original data packet 240 or data segment 244 is collected as "packet identifying data" 310 (e.g., a length vector). In the example shown, the packet identifying data 310 can be reassembled as an information packet 320 by adding a header.

The first PEP 230 can process the original data packets 240 and extract the data segments 244 for each of them. For example, in a typical implementation, the operating system may strip the headers 242 from the original data packets 240 before forwarding the data segments 244 to the corresponding application. The data segments carry payload of the original data packets 240. All extracted data segments 244 are then used to create performance enhanced data packets 260. Specifically, the data segments 244 are broken apart and encapsulated in the performance enhanced data segments 264. The performance enhanced data packet 260 also comprises a header 262 carrying certain service information.

Subsequently, the performance enhanced data packet 260 is transmitted over the WAN 150 to the second PEP 230. The information packet 320 is also transmitted to the second PEP 230 using the same communication channel or another one. For example, the performance enhanced data packet 260 and the information packet 320 can be transmitted one after another or simultaneously.

Once the second PEP 230 receives the performance enhanced data packet 260 and the information packet 320, the second PEP 230 reads information related to the lengths of original data packets 240 encapsulated within the information packet 320, and then extracts data segments 244 exactly as if they were received in the first PEP 230. In some embodiments, if the encryption and/or compression were previously used, the second PEP 230 may additionally implement decryption and/or decompression.

Further, the second PEP 230 may generate new headers which are the same headers as the headers 242 for each data segment 244 such that new data packets 330 can be regenerated, which are identical to the original data packets 240. The regenerated data packets 330 are then delivered to the destination party 220.

Figure 4:
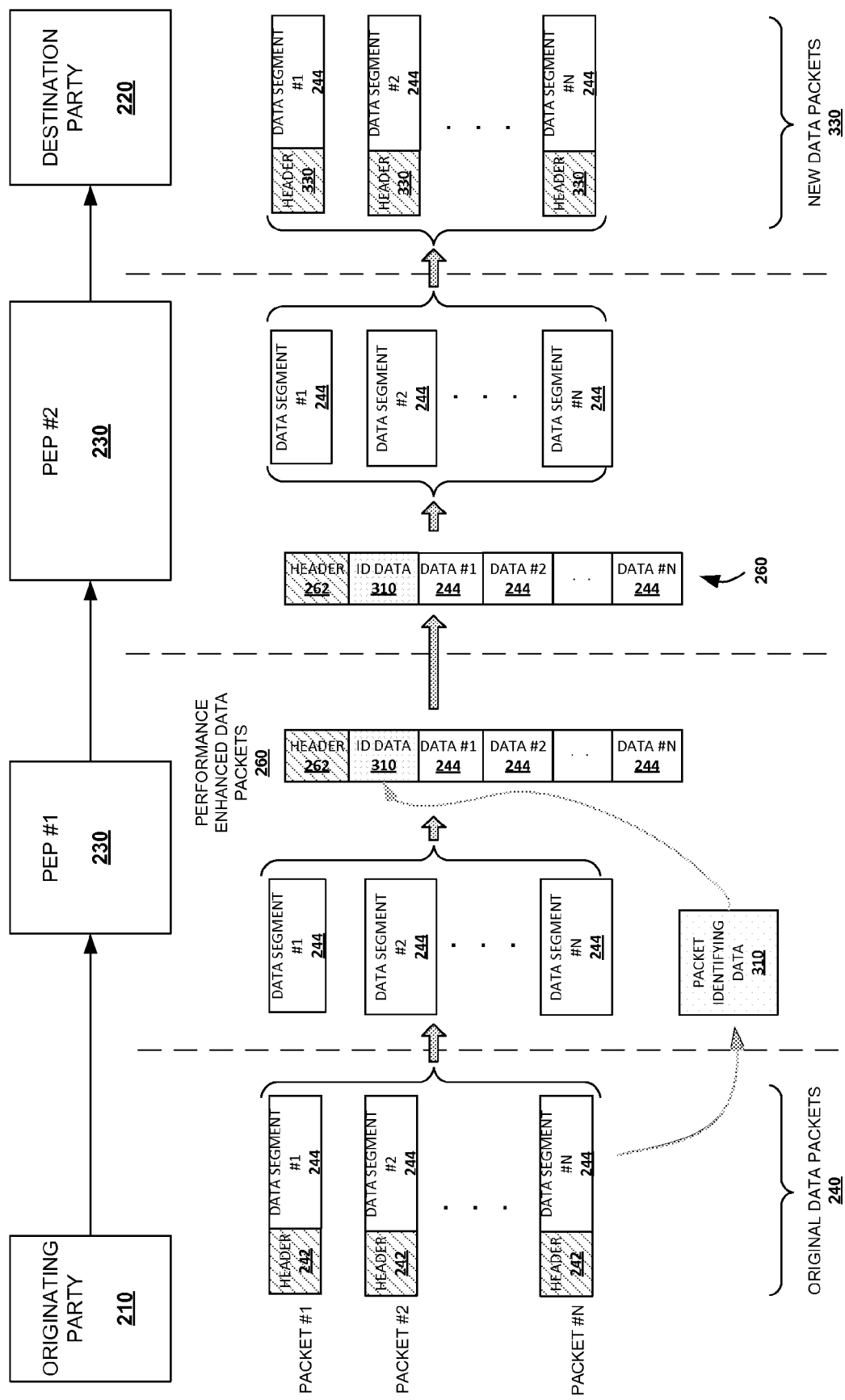
FIG. 4 is a block diagram showing a further approach for processing data packets in a PEP environment, according to another embodiment.

FIG. 4 is a block diagram showing an approach for processing data packets in a PEP environment.

Similarly to the above described, the originating party 210 may generate original data packets 240, which comprise headers 242 and data segments 244.

The first PEP 230 may receive the original data packets 240 and temporary buffer them for a predetermined period of time. The first PEP 230 may then determine the lengths for each buffered original data packet 240. The information about lengths is then collected as packet identifying data 310.

The first PEP 230 also processes the buffered original data packets 240 and extracts the data segments 244 for each of them. The extracted data segments 244 are then used to create a performance enhanced data packet 260. Specifically, the data segments 244 are encapsulated in the performance enhanced data packet 260 such that they occupy the data segment 244. The performance enhanced data packet 260 also comprises a header 262, which carries certain service information.

In contrast to the approach disclosed with reference to FIG. 3, the packet identifying data 310 is incorporated into the performance enhanced data packet 260. In an example embodiment, the packet identifying data 310 is positioned between the header 262 and the data segment 264. In some other embodiments, the packet identifying data 310 can be incorporated within the header 262 or within the data segment 244. The packet identifying data 310 can also be somehow encrypted and/or compressed. In either case, the packet identifying data 310 is transmitted in the performance enhanced data packet 260. Further, the performance enhanced data packet 260 is transmitted over the WAN 150 to the second PEP 230.

Once the second PEP 230 receives the performance enhanced data packet 260, the second PEP 230 retrieves information about the lengths of original data packets 240, and then extracts data segments 244 exactly as they were retrieved in the first PEP 230. Again, if encryption and/or compression were previously used, the second PEP 230 may additionally implement decryption and/or decompression.

Further, the second PEP 230 may generate new headers which can be the same headers as the headers 242 for each data segment 244 such that new data packets 330 can be regenerated, which are identical to the original data packets 240. The regenerated data packets 330 are then delivered to the destination party 220.

Figure 5:
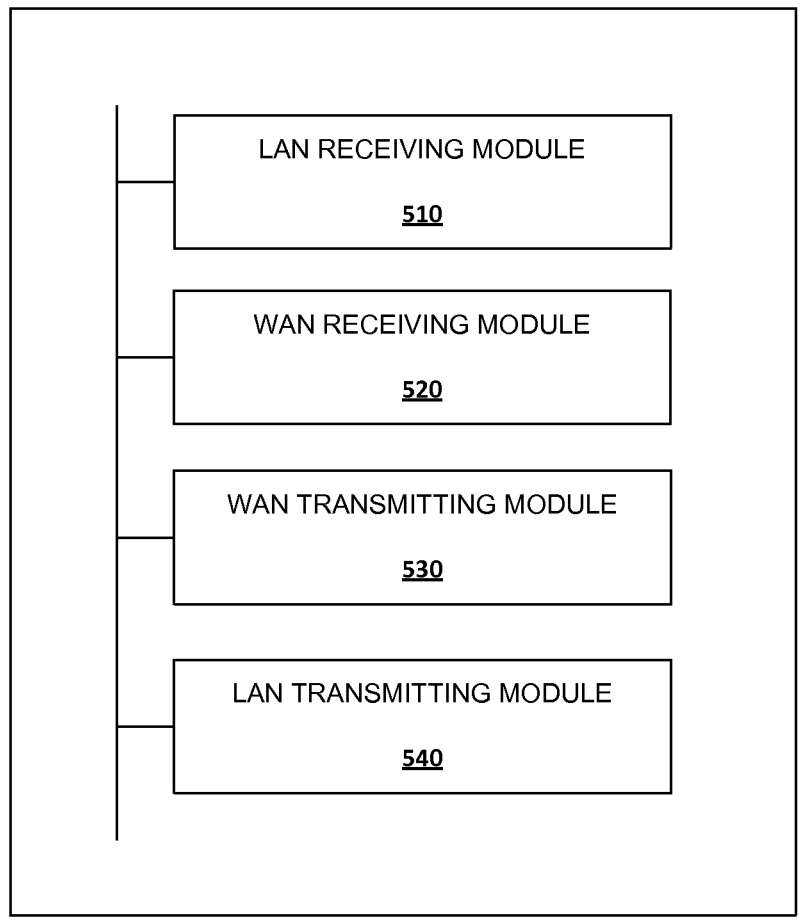
FIG. 5 is a diagram of a system for processing network packets.

FIG. 5 is a diagram of a system 500 for processing network packets. In this embodiment, the system 500 for processing network packets may include an LAN receiving module 510, a WAN receiving module 520, a WAN transmitting module 530, and a LAN transmitting module 540. The system 500 for processing network packets, in this context, may refer to the first and second PEPs 230.

In other embodiments, the system 500 for processing network packets may include additional, fewer, or different modules for various applications. Furthermore, all modules can be integrated within a single apparatus, or, alternatively, can be remotely located and optionally be accessed via a third party.

The LAN receiving module 510 may be configured to receive network data to be transported between the first PEP 230 and the second PEP 230. The LAN receiving module 510 may be receiving LAN data from the LAN 120 shown in FIG. 1. The LAN receiving module 510 may be configured to collect packet identifying data 310 associated with the one or more original network data packets 240 before the network data is packetized into one or more performance enhanced packets 260 by the first PEP 230. The LAN receiving module 510 may pass the data to the WAN receiving module 520. The WAN receiving module 520 can be further configured to determine the lengths of the original data packets 240 and/or the data segments 244.

In addition, the WAN receiving module 520 can be configured to receive the performance enhanced data packet 260, the packet identifying data 310, and/or the information packet 320 from another PEP 230. Once the performance enhanced data packets are created the WAN transmitting module 530 may transmit the data to the WAN 150 shown in FIG. 1.

The WAN transmitting module 530 can also be configured to generate the performance enhanced data packet 260, which comprises previously extracted data segments 244. The WAN transmitting module 530 can be further configured to transmit the performance enhanced data packet 260 and the packet identifying data 310 (and/or the information packets 320) to the second PEP 230.

The LAN transmitting module 540 can be configured to recreate the segmentation of the packet data as the one or more original network data packets 240. The recreation can be implemented utilizing the packet identifying data 310 and/or the information packets 320.

Figure 6:
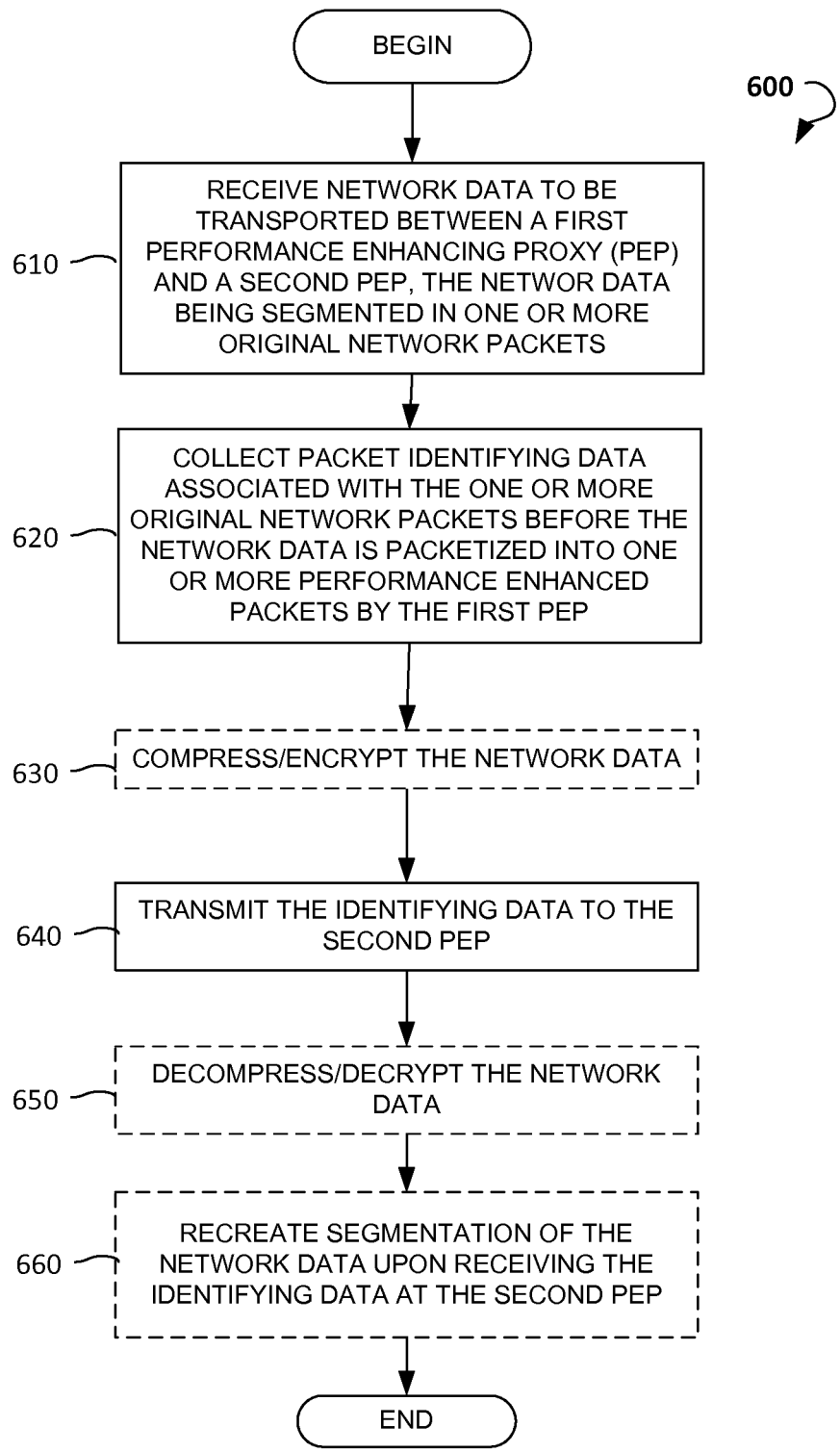
FIG. 6 is a process flow diagram showing a method for processing network packets within a PEP environment.

FIG. 6 is a process flow diagram showing a method 600 for processing network packets within a PEP environment. The method 600 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the first and/or second PEP 230.

The method 600 can be performed by various modules discussed above with reference to FIG. 5. Each of these modules can comprise processing logic. It will be appreciated by one of ordinary skill that examples of the foregoing modules may be virtual, and instructions said to be executed by a module may, in fact, be retrieved and executed by a processor. Although various modules may be configured to perform some or all of various steps described herein, fewer or more modules may be provided and still fall within the scope of various embodiments.

As shown in FIG. 6, the method 600 may commence at operation 610 with the LAN receiving module 510 receiving network data to be transported between the first PEP 230 and the second PEP 230. The received network data can be segmented in one or more original network data packets 240.

At operation 620, the WAN receiving module 520 may receive packet identifying data 310 associated with the one or more original network data packets 240 before the network data is packetized into one or more performance enhanced packets 260 by the first PEP 230. The packet identifying data 310 may be descriptive of lengths of the one or more original network data packets 240 and/or their data segments 244. At operation 630 the packet data can be optionally compressed/encrypted.

At operation 640, the WAN transmitting module 530 may transmit the packet identifying data 310 to the second PEP 230. As mentioned, the packet identifying data 310 can be transmitted within the one or more performance enhanced packets 260 (e.g., by being encapsulated between the header 262 and the data segment 244) or separately (for example, as the information packet 320).

If the network data was optionally compressed/encrypted at operation 620, it can be decompressed/decrypted at operation 650.

The method 600 may further comprise an optional operation 660, with the LAN transmitting module 540 recreating the segmentation of the packet data as the one or more original network data packets 240. Accordingly, the recreation can be implemented utilizing the packet identifying data 310 and/or the information packets 320.

Figure 7:
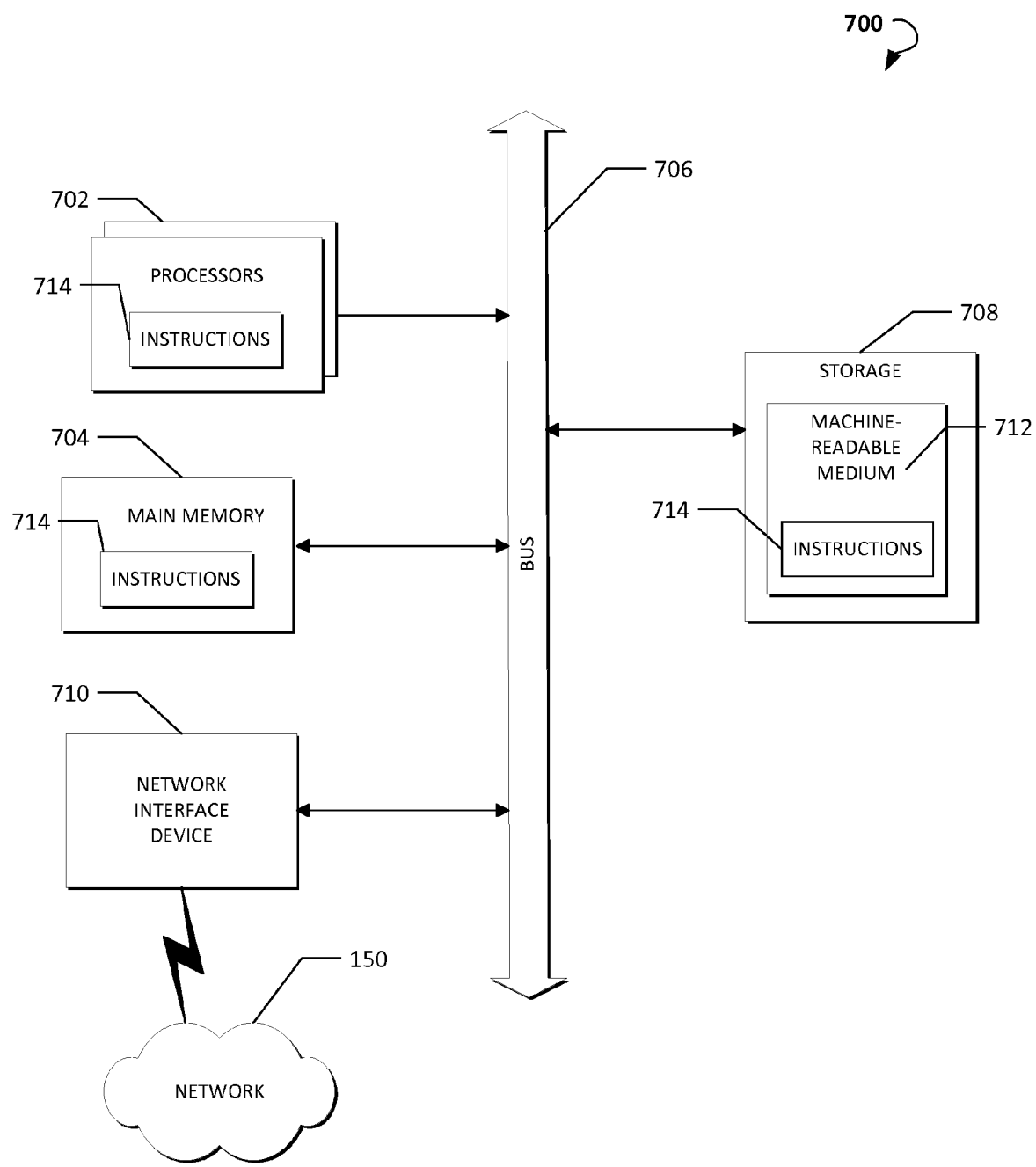
FIG. 7 is a diagram of an example machine in the form of a computer system within which a set of instructions, for the machine to perform any one or more of the methodologies discussed herein, is executed.

FIG. 7 shows a diagrammatic representation of a computing device for a machine in the example electronic form of a computer system 700, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peerto-peer (or distributed) network environment. The machine can be a server, a storage system, a personal computer (PC), a tablet PC, a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 702 (e.g., a central processing unit (CPU)), and a main memory 704, which communicate with each other via a bus 706. The computer system 700 can further include a storage 708 and a network interface device 710.

The storage 708 may include a computer-readable medium 712 which stores one or more sets of instructions and data structures (e.g., instructions 714) embodying or utilized by any one or more of the methodologies or functions described herein. The instructions 714 can also reside, completely or at least partially, within the main memory 704 and/or within the processors 702 during execution thereof by the computer system 700. The main memory 704 and the processors 702 also constitute machine-readable media. The instructions 714 can further be transmitted or received over the network 150 via the network interface device 710 utilizing any one of a number of well-known transfer protocols (e.g., TCP/IP, UDP, HTTP, CAN, Serial, and Modbus).

While the computer-readable medium 712 is shown in an example embodiment to be a single medium, the term "computer-readable medium" should be taken to include a single medium or multiple media (e.g., a centralized or distributed database, and/or associated buffers and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks (DVDs), random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Java, C, C++, Perl, Visual Basic, or other compilers, assemblers, interpreters or other computer languages or platforms.

Thus, computer-implemented method and systems for processing network packets within a PEP environment are described. These methods and systems may effectively process data packets by PEPs so that the data packets can be reassembled when they are outputted from the PEP environment exactly as they were inputted into the PEP environment, regardless how they were transmitted within this environment. The described approaches significantly reduce a number of failures or break downs when stacks or software applications can not process data packets transferred through the PEP environment.

Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for processing network packets, the method comprising:
   receiving network data to be transported between a first Performance Enhancing Proxy (PEP) and a second PEP, the network data being segmented into two or more original network data packets;
   removing a header from each of the two or more original network data packets and collecting packet identifying data associated with the two or more original network data packets from the removed header before the network data is packetized into one or more performance enhanced packets by the first PEP, the packet identifying data comprising information regarding the segmentation of the network data into the two or more original network data packets; and
   transmitting the packet identifying data to the second PEP, the second PEP exactly reproducing the original packet segmentation of the network data upon receiving the packet identifying data from the first PEP by:
      retrieving information about each length of the two or more original network data packets from the packet identifying data,
      extracting data segments in the two or more original network data packets exactly as they were received in the first PEP, and
      generating new headers which are the same as the removed headers for each one of the extracted data segments, such that new data packets are regenerated, the regenerated new data packets being identical to the two or more original network data packets.

2. The method of claim 1, wherein the second PEP recreates the original packet segmentation of the network data upon receiving the packet identifying data from the first PEP.

3. The method of claim 2, wherein the packet identifying data includes one or more of the following: lengths, length deltas, Differentiated Services Code Point (DSCP) markings, priority markings, and options.

4. The method of claim 1, wherein the one or more original network data packets are complying with a Transmission Control Protocol (TCP).

5. The method of claim 1, wherein the packet identifying data is transmitted with the network data.

6. The method of claim 1, wherein the network data is compressed or encrypted.

7. The method of claim 1, wherein the packet identifying data is transmitted separately from the network data.

8. The method of claim 1, wherein the packet identifying data is descriptive of lengths of the two or more original data packets.

9. A computer-implemented method for processing network packets, the method comprising:

receiving compressed network data to be transported between a first Performance Enhancing Proxy (PEP) and a second PEP, the network data being segmented into two or more original network data packets;

removing a header from each of the two or more original network data packets and collecting packet identifying data associated with the two or more original network data packets from the removed header, before the compressed network data is packetized into one or more performance enhanced packets by the first PEP, the packet identifying data comprising data regarding the segmentation of the network data into the two or more original network data packets; and transmitting the identifying data to the second PEP, the second PEP exactly reproducing the original packet segmentation of the network data upon receiving the packet identifying data from the first PEP by:

retrieving information about each length of the two or more original network data packets from the packet identifying data, extracting data segments in the two or more original network data packets exactly as they were received in the first PEP, and generating new headers which are the same as the removed headers for each one of the extracted data segments, such that new data packets are regenerated, the regenerated new data packets being identical to the two or more original network data packets.

10. The method of claim 9, wherein the second PEP recreates the original packet segmentation of the network data upon receiving the packet identifying data from the first PEP.

11. The method of claim 10, wherein the packet identifying data includes one or more of the following: lengths, length deltas, Differentiated Services Code Point (DSCP) markings, priority markings, and options.

12. The method of claim 9, wherein the packet identifying data is transmitted with the network data.

13. The method of claim 11, wherein the packet identifying data is inserted into the network data after the network data is compressed and before the network data is encrypted.

14. The method of claim 9, wherein the packet identifying data is transmitted separately from the network data.

15. A system for processing network packets, the system comprising:

a first module, stored in memory and executed by at least one processor, that receives network data to be transported between a first Performance Enhancing Proxy (PEP) and a second PEP, the network data being segmented into two or more original network data packets;

a second module, stored in memory and executed by the at least one processor, that removes a header from each of the two or more original network data packets and collects packet identifying data associated with the two or more original network data packets from the removed header before the network data is packetized into one or more performance enhanced packets by the first PEP, the packet identifying data comprising data regarding the segmentation of the network data into the two or more original network data packets; and a third module, stored in memory and executed by the at least one processor, that transmits the packet identifying data to the second PEP;

the second PEP exactly reproducing the original packet segmentation of the network data upon receiving the packet identifying data from the first PEP by:

retrieving information about each length of the two or more original network data packets from the packet identifying data, extracting data segments in the two or more original network data packets exactly as they were received in the first PEP, and generating new headers which are the same as the removed headers for each one of the extracted data segments, such that new data packets are regenerated, the regenerated new data packets being identical to the two or more original network data packets.

16. The system of claim 15, further comprising a fourth module, stored in memory and executed by the at least one processor, that recreates the original packet segmentation of the network data.

17. The system of claim 16, wherein the packet identifying data includes one or more of the following: lengths, length deltas, Differentiated Services Code Point (DSCP) markings, priority markings, and options.

18. The system of claim 15, wherein the third module is configured to transmit the packet identifying data with the network data.

19. The system of claim 15, wherein the network data is compressed or encrypted.

20. The system of claim 15, wherein the third module is configured to transmit the packet identifying data separately from the network data.

21. The system of claim 15, wherein the packet identifying data is descriptive of lengths of the one or more original data packets.

22. A system for processing network packets, the system comprising:

a first module, stored in memory and executed by at least one processor, to receive compressed network data to be transported between a first Performance Enhancing Proxy (PEP) and a second PEP, the network data being received in two or more original network data packets;

a second module, stored in memory and executed by the at least one processor, to remove a header from each of the two or more original network data packets and collect packet identifying data associated with the two or more original network data packets from the removed header before the compressed network data is packetized into one or more performance enhanced packets by the first PEP, the packet identifying data comprising data regarding the segmentation of the network data into the two or more original network data packets; and a third module, stored in memory and executed by the at least one processor, to transmit the packet identifying data to the second PEP;

the second PEP exactly reproducing the original packet segmentation of the network data upon receiving the packet identifying data from the first PEP by:

retrieving information about each length of the two or more original network data packets from the packet identifying data, extracting data segments in the two or more original network data packets exactly as they were received in the first PEP, and generating new headers which are the same as the removed headers for each one of the extracted data segments, such that new data packets are regenerated, the regenerated new data packets being identical to the two or more original network data packets.

23. The system of claim 22, further comprising a fourth module, stored in memory and executed by the at least one processor, that recreates the original packet segmentation of the network data.

24. The system of claim 23, wherein the packet identifying data includes one or more of the following: lengths, length deltas, Differentiated Services Code Point (DSCP) markings, priority markings, and options.

25. The system of claim 22, wherein the third module is configured to transmit the packet identifying data with the network data.

26. The system of claim 25, wherein the packet identifying data is inserted into the network data after the network data is compressed and before the network data is encrypted.

27. The system of claim 22, wherein the third module is configured to transmit the packet identifying data separately from the network data.

28. The system of claim 22, wherein the packet identifying data is descriptive of compressed lengths of the two or more original data packets.

29. A non-transitory computer-readable medium having instructions stored thereon, which when executed by one or more computers, causes the one or more computers to:
  receive network data to be transported between a first Performance Enhancing Proxy (PEP) and a second PEP, the network data being segmented into two or more original network data packets;
  remove a header from each of the two or more original network data packets and collect packet identifying data associated with the two or more original network data packets from the removed header before the network data is packetized into one or more performance enhanced packets by the first PEP, the packet identifying data comprising data regarding the segmentation of the network data into the two or more original network data packets; and
  transmit the packet identifying data to the second PEP, the second PEP exactly reproducing the original packet segmentation of the network data upon receiving the packet identifying data from the first PEP by:
    retrieving information about each length of the two or more original network data packets from the packet identifying data,
    extracting data segments in the two or more original network data packets exactly as they were received in the first PEP, and
    generating new headers which are the same as the removed headers for each one of the extracted data segments, such that new data packets are regenerated, the regenerated new data packets being identical to the two or more original network data packets.

30. A non-transitory computer-readable medium having instructions stored thereon, which when executed by one or more computers, causes the one or more computers to:
  receive compressed network data to be transported between a first Performance Enhancing Proxy (PEP) and a second PEP, the network data being received in two or more original network data packets;
  remove a header from each of the two or more original network data packets and collect packet identifying data associated with the two or more original network data packets from the removed header before the compressed network data is packetized into one or more performance enhanced packets by the first PEP, the packet identifying data comprising data regarding the segmentation of the network data into the two or more original network data packets; and
  transmit the identifying data the second PEP, the second PEP exactly reproducing the original packet segmentation of the network data upon receiving the packet identifying data from the first PEP by:
    retrieving information about each length of the two or more original network data packets from the packet identifying data,
    extracting data segments in the two or more original network data packets exactly as they were received in the first PEP, and
    generating new headers which are the same as the removed headers for each one of the extracted data segments, such that new data packets are regenerated, the regenerated new data packets being identical to the two or more original network data packets.

* * * * *